May 13, 1952 P. WALDINGER 2,596,628

DIALING MEANS FOR DIAL TELEPHONES

Filed Sept. 2, 1950

INVENTOR
Paul Waldinger
BY
Arthur E. Dowell
ATTORNEY

Patented May 13, 1952

2,596,628

UNITED STATES PATENT OFFICE 2,596,628

DIALING MEANS FOR DIAL TELEPHONES

Paul Waldinger, Flushing, N. Y.

Application September 2, 1950, Serial No. 182,938

3 Claims. (Cl. 179—90)

The present invention relates to an improved dialing means for a dial telephone.

The object of the invention is to provide an inexpensive dialing means which may be removably attached to the finger stop of a dial telephone.

It is customary for telephone users to be provided with a conventional dial engaging member having a ball at one end adopted to be inserted into the apertures of the rotary dialing disc, and a writing element at the other end.

These dial engaging members are frequently lost or in an unconvenient place when needed, so it is an object of the present invention to provide a holder for this type of dial engaging member which may be removably secured to the finger stop of the dial phone.

The holder for the dial engaging member is provided with a flat substantially square plate with an angularly disposed slot therein adapted to fit along each side of the depending portion of the finger stop between the stationary dial and the rotary aperture plate.

An integral tubular member angularly disposed on the slotted plate holds the dial engaging member in a convenient angular position when needed.

The angular disposition of the tubular holder on the slotted plate makes the device function equally as well on either a desk phone or a wall phone where the normal position of the dial is horizontal and vertical respectively.

The holder when mounted on the telephone is so designed that no operating parts of the telephone are interferred with during the process of dialing, and since the holder is preferably made of plastic it will not damage any parts of the phone by way of weight or scratching.

Other advantages of the present invention will be obvious as brought out in the following specification.

Figures 1, 2, 3, 4:
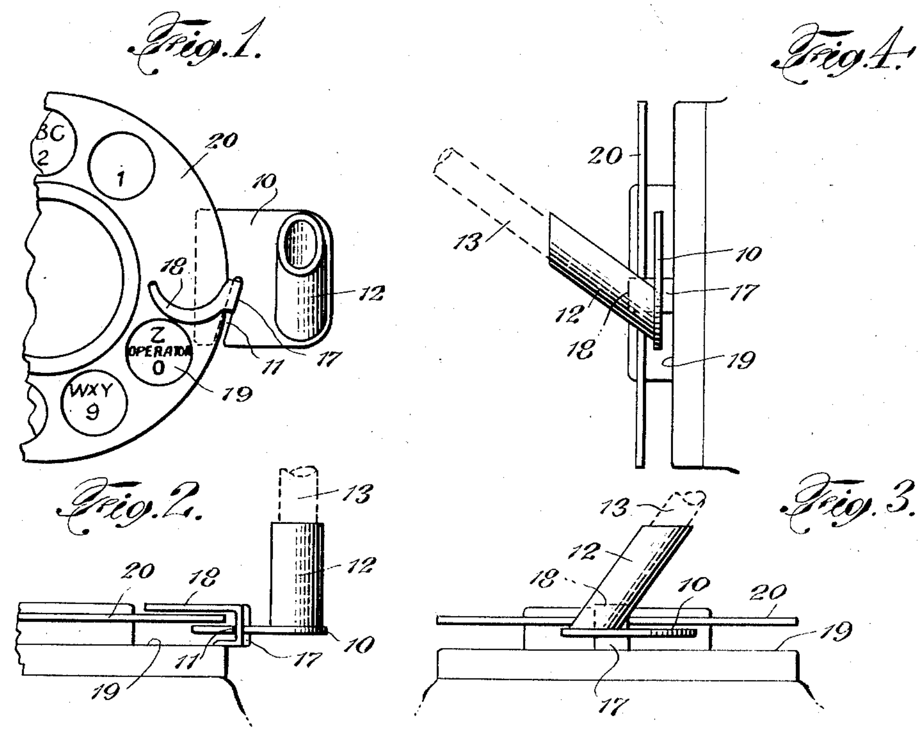
Figure 5:
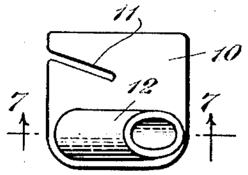
Figure 10:
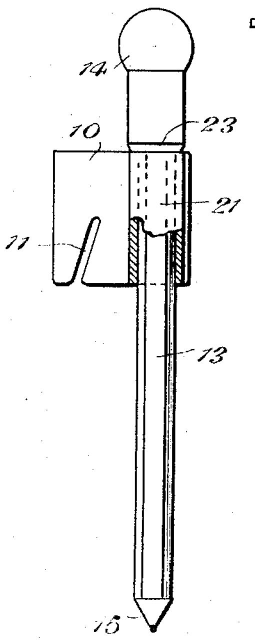
Figure 9:
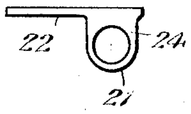
Figure 8:
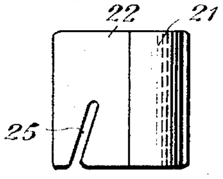
Figure 6:
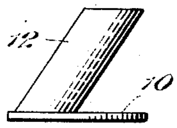
Figure 7:
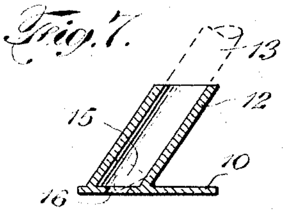

Reference will be had to the accompanying drawing forming a part of this specification, in which, Fig. 1 is a top view of the present invention, showing the dialing means attached to a fragmentary portion of a desk phone, Fig. 2 is a front view or elevational view of the present invention as shown in Fig. 1, Fig. 3 is a side view of Fig. 2, Fig. 4 is a side view of the present invention showing it attached to a wall telephone, Fig. 5 is a top plan view of the holder, Fig. 6 is a front view of Fig. 5, Fig. 7 is a section on the line 7—7 of Fig. 5, Fig. 8 is a front view of a modified form of holder especially adapted for use on a wall phone, Fig. 9 is a top view of Fig. 8; and Fig. 10 is a front view of the modified form of holder, showing how a conventional dial engaging member is held by this form of holder.

Referring to the drawings, and more particularly to Figs. 5, 6 and 7, wherein I have shown, by way of illustration merely, it will be observed that the present invention for holding a telephone dial engaging member comprises a base plate 10 having an angular disposed slot 11 therein for removably securing the holder to a dial telephone as hereinafter explained.

The base plate 10 supports an angularly disposed tubular member 12 integral with the base plate 10 which is used to receive and hold a conventional dial engaging member 13 having the usual ball 14 on one end and a writing element 15 at the other end.

The writing element 15 when introduced into the tubular member 12 slightly protrudes through the small aperture 16 in the base plate 10 and at the bottom of the tubular member 12 which serves to protect the writing element 15, and also prevents the body of the dial engaging member from sliding below the base plate 10.

The tubular member 12 is of a sufficient length to have a good purchase on the dial engaging member 13 and includes a snug fit between the dial engaging member and the tube, so that no vibration will dislodge it from the tube especially when it is used on a wall phone.

Referring to Figs. 1, 2 and 3 it will be observed how the holder is attached to the desk dial phone.

The slot 11 in the base plate 10 is passed along each side of the depending portion 17 of the finger stop 18 between the dial face 19 and the rotary disc 20, and in the position shown in Fig. 1, it will be seen that no part of the device interferes with the operation of the dialing system of the telephone.

The dialing device is secured to the wall telephone in a similar manner as shown in Fig. 4.

A modified form of holder particularly adapted for use on a wall telephone is shown in Figs. 8, 9 and 10. In this form the tubular member 21 is integral with the base plate 22 and lies flat against it and is open at each end to receive the dial engaging member.

In this form the dial engaging member is suspended parallel with the wall and held suspended inside of the tube by reason of the enlarged portion 23 of the ball 14 resting upon the upper face of the tubular member 21.

A slot 25 in this form is fixed to the finger stop 18 in a similar manner to the slot 11 in the preferred form of the device.

I claim:

1. An improved dialing means for dial telephones having the conventional finger stop on said dial including, a dial engaging member, a substantially square base plate having an angularly disposed slot therein relative to the adjacent side of said base plate for engagement with a part of the aforesaid finger stop, and an angularly disposed tubular member integral with said base plate for supporting said dial engaging member.

2. An improved dialing means for dial telephones having the conventional finger stop on said dial including, a dial engaging member, a substantially square base plate having an angularly disposed slot therein adapted to engage with a part of the aforesaid finger stop, and a tubular member integral with said base plate for supporting said dial engaging members.

3. An improved dialing means for dial telephones having the conventional finger stop on said dial including, a dial engaging member, a substantially square base plate having an angularly disposed slot therein adjacent one side of said base plate for engagement with a part of said finger stop on said dial, and a tubular member integral with said base plate and located on the opposite side of said plate from said slot for supporting said dial engaging member.

PAUL WALDINGER.

REFERENCES CITED

The following references are of record in the file of this patent:

UNITED STATES PATENTS

| Number | Name | Date |
|---|---|---|
| 1,772,325 | Shinn | Aug. 5, 1930 |
| 1,938,259 | Jackson | Dec. 5, 1933 |
| 2,285,286 | Kirkman | June 2, 1942 |
| 2,416,127 | Cotton | Feb. 18, 1947 |